United States Patent
Unno et al.

(10) Patent No.: US 8,374,851 B2
(45) Date of Patent: Feb. 12, 2013

(54) VOICE ACTIVITY DETECTOR AND METHOD

(75) Inventors: Takahiro Unno, Richardson, TX (US);
Jesper Gormsen Kragh, Langaa (DK);
Fabien Ober, Villeneuve-Loubet (FR);
Ali Erdem Ertan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1165 days.

(21) Appl. No.: 11/830,343

(22) Filed: Jul. 30, 2007

(65) Prior Publication Data

US 2009/0036170 A1 Feb. 5, 2009

(51) Int. Cl.
G10L 11/06 (2006.01)
G10L 15/20 (2006.01)
G10L 19/14 (2006.01)
G10L 21/02 (2006.01)
H04M 9/08 (2006.01)

(52) U.S. Cl. ........ 704/208; 704/233; 704/205; 704/225; 704/226; 379/406.01

(58) Field of Classification Search .................. 704/208, 704/233, 205, 225, 226; 381/94.3, 94.7; 379/406.01
See application file for complete search history.

(56) References Cited

U.S. PATENT DOCUMENTS

| | | | |
|---|---|---|---|
| 4,600,815 A * | 7/1986 | Horna | 379/406.08 |
| 4,741,038 A * | 4/1988 | Elko et al. | 381/92 |
| 5,305,307 A * | 4/1994 | Chu | 370/288 |
| 5,471,527 A * | 11/1995 | Ho et al. | 379/347 |
| 5,796,818 A * | 8/1998 | McClennon et al. | 379/406.06 |
| 5,839,101 A * | 11/1998 | Vahatalo et al. | 704/226 |
| 6,163,608 A * | 12/2000 | Romesburg et al. | 379/406.01 |
| 6,212,273 B1 * | 4/2001 | Hemkumar et al. | 379/406.08 |
| 6,570,985 B1 * | 5/2003 | Romesburg | 379/406.08 |
| 6,570,986 B1 * | 5/2003 | Wu et al. | 379/406.09 |
| 6,665,402 B1 * | 12/2003 | Yue et al. | 379/406.04 |
| 6,799,062 B1 * | 9/2004 | Piket et al. | 455/569.1 |
| 7,024,353 B2 * | 4/2006 | Ramabadran | 704/205 |
| 7,242,762 B2 * | 7/2007 | He et al. | 379/406.08 |
| 7,254,194 B2 * | 8/2007 | Lin et al. | 375/345 |
| 7,388,954 B2 * | 6/2008 | Pessoa et al. | 379/386 |
| 7,627,111 B2 * | 12/2009 | Bershad et al. | 379/406.02 |
| 8,077,641 B2 * | 12/2011 | Basu | 370/286 |
| 2003/0053639 A1 * | 3/2003 | Beaucoup et al. | 381/92 |
| 2004/0124827 A1 * | 7/2004 | Winn | 324/76.39 |
| 2005/0143988 A1 * | 6/2005 | Endo et al. | 704/226 |
| 2006/0149542 A1 * | 7/2006 | Tanrikulu et al. | 704/233 |

OTHER PUBLICATIONS

Faller, C.; Chen, J.; , "Suppressing Acoustic Echo in a Spectral Envelope Space," Speech and Audio Processing, IEEE Transactions on , vol. 13, No. 5, pp. 1048-1062, Sep. 2005.*
IBM Technical Disclosure Bulletin, Automatic Gain Control With Equalizer vol. 21, Issue No. 9, pp. 3569-3570, Feb. 1979.*
Storn R., "Echo Cancellation Techniques for Multimedia Applications—A Survey," Int'l Comp. Sci Inst. TR-96-046, Berkeley, CA, Nov. 1996.*

* cited by examiner

*Primary Examiner* — Edgar Guerra-Erazo
(74) *Attorney, Agent, or Firm* — Ronald O. Neerings; Wade James Brady, III; Frederick J. Telecky, Jr.

(57) ABSTRACT

Acoustic echo control for hands-free phone has acoustic echo cancellation and echo suppression with a voice activity detection for the echo suppression based on near-end input power together with an estimate for acoustic echo cancellation gain.

5 Claims, 2 Drawing Sheets

VOICE ACTIVITY DETECTOR AND METHOD

CROSS-REFERENCE TO RELATED APPLICATIONS

The following co-assigned co-pending patent applications disclose related subject matter: application Ser. No. 11/165,902, filed Jun. 24, 2005.

BACKGROUND OF THE INVENTION

The present invention relates to signal processing, and more particularly to voice activity detection, acoustic echo cancellation, and echo suppression devices and methods.

Hands-free phones (e.g., speakerphones) provide conveniences such as conversations while driving an automobile and teleconferencing with multiple talkers at a single speakerphone. However, acoustic reflections of the loudspeaker output of a hands-free phone to its microphone input simulate another participant talker and thus appear as an echo to the original remote talker. Thus hands-free phones require acoustic echo control to sufficiently reduce the echo in the sending path (uplink, near-end). Acoustic echo control is done by acoustic echo canceller (AEC) and echo suppressor (ES). AEC estimates the linear echo path between the receiving-side (downlink, far-end) output loudspeaker and the sending-side (uplink) input microphone, and subtracts the estimated echo from the uplink signal. In practical cases, AEC does not completely remove all of the acoustic echo, and ES attenuates the AEC residual echo to make the far-end echo inaudible at uplink output. Typical implementations of AEC and ES functions are in digital systems (e.g., analog signals sampled at 8 kHz and partitioned into 20 ms frames of 160 samples each) where the AEC applies an adaptive FIR digital filter to estimate the echo from the signal driving the loudspeaker and updates the filter coefficients after each frame.

Estimation of the echo residual after echo cancellation allows for echo suppression (ES) by gain adjustment. Echo suppression may be applied to degrees of full, partial, or half-duplex communications: see ITU-T Recommendation P.340 Transmission Characteristics and Speech Quality Parameters of Hands-free Terminals (May 2000) and ETSI TR 101 110-GSM 3.58 Digital Cellular Telecommunications System: Characterization Test Methods and Quality Assessment for Handsfree Moblie Stations v.8.0.0 (April 2000).

However, if AEC performance is significantly degraded and the AEC residual echo level is the same or higher than near-end speech level ES does not properly distinguish double-talk from far-end echo, makes acoustic system half-duplex by attenuating both far-end echo and near-end speech while far-end is talking. This problem is often observed if severe nonlinear distortion is present in the echo path. For example, in mobile phone speakerphone applications, the loudspeaker is overdriven and the distance between loudspeaker and microphone is short. This phone setting could cause severe nonlinear distortion in the echo path. As a result, conventional ES allows mobile phone to provide only half-duplex communication and significantly degrades communication quality.

SUMMARY OF THE INVENTION

The present invention provides near-end voice activity detection based on both near-end input power and expected acoustic echo cancellation gain. The voice activity detection can be used in echo suppression and/or acoustic echo control systems.

DESCRIPTION OF THE PREFERRED EMBODIMENTS

1. Overview

Preferred embodiment methods provide near-end voice activity detection (VAD) based on both near-end input power and expected acoustic echo cancellation (AEC) gain in a hands-free system. This allows echo suppression (ES) to work in partial-duplex even when severe nonlinear distortion significantly degrades AEC performance. Preferred embodiment acoustic echo control uses preferred embodiment ES with preferred embodiment VAD; see FIGS. 1a-1b.

Figure 2B:
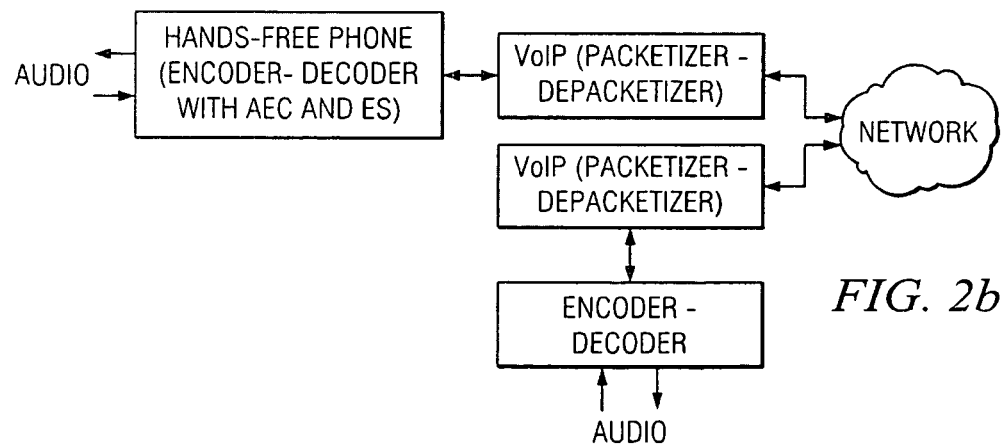
FIGS. 2a-2b show a mobile system and network communication.
Figure 2A:
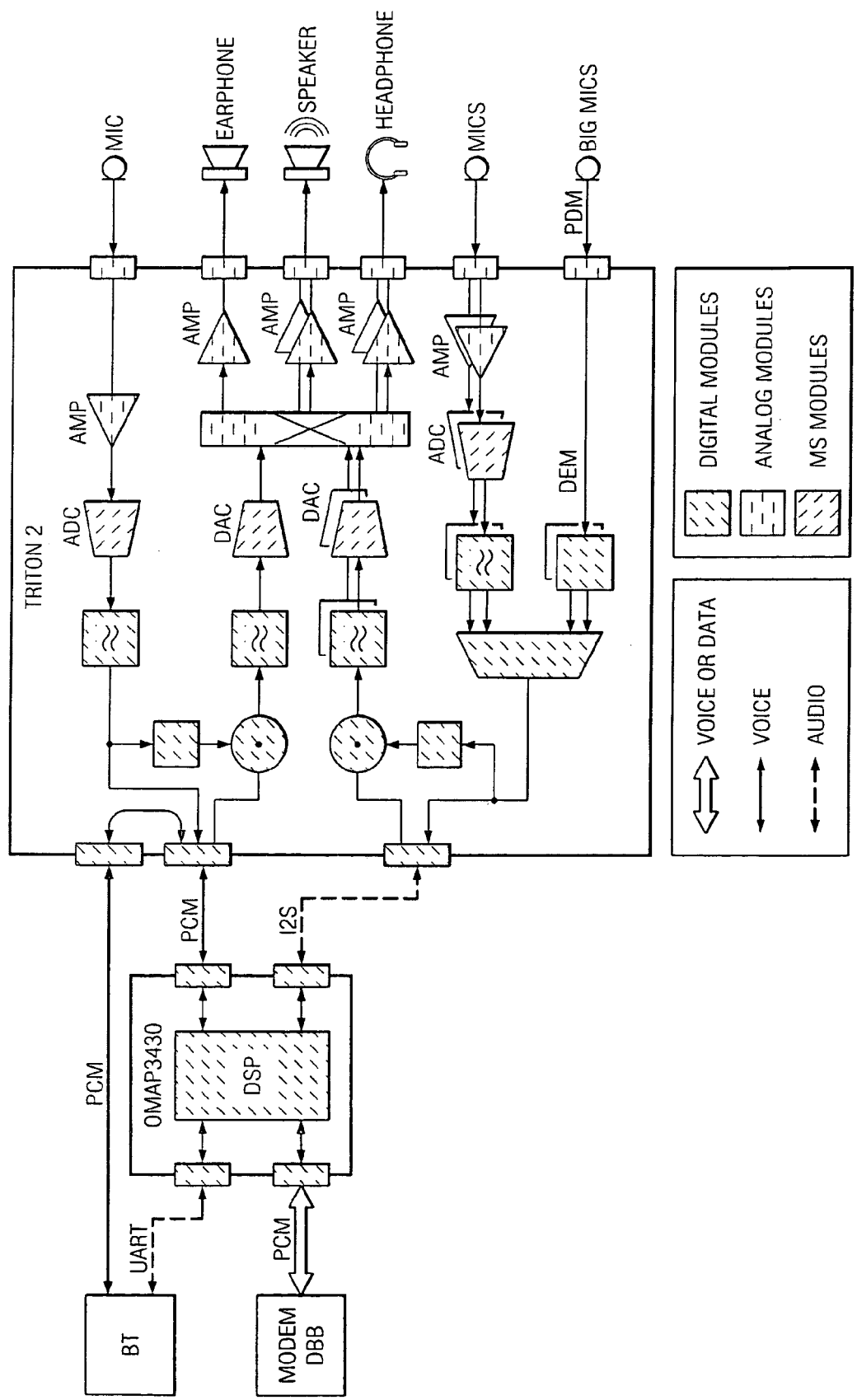

Preferred embodiment systems (e.g., hands-free cellphones, speakerphones, etc.) perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 2a shows functional blocks of an example of a mobile system capable of hands-free support. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as packetized over the Internet (VoIP); see FIG. 2b.

2. First Preferred Embodiments

Figure 1A:
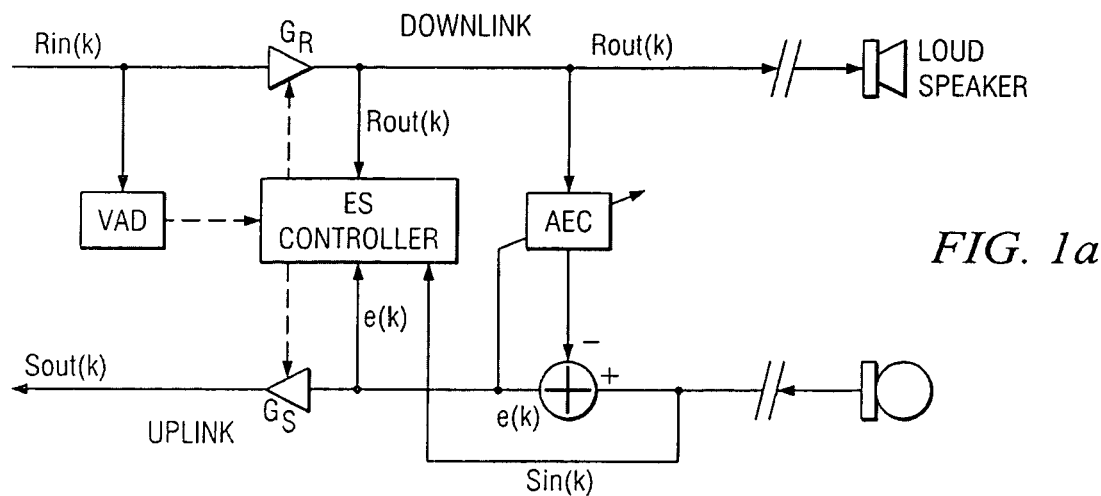
FIGS. 1a-1b show an acoustic control system and an ES controller.

The preferred embodiment near-end voice activity detection (VAD) methods can be integrated into any echo suppressor and/or acoustic module that needs to identify "far-end echo only" and "double-talk" segments. For example, FIG. 1a shows an overview block diagram of a preferred embodiment acoustic control system with an acoustic echo canceller (AEC) and an echo suppressor (ES). The AEC (using an adaptive FIR filter labeled "AEC" in FIG. 1a) estimates the Rout(k)-driven loudspeaker output picked up by the microphone and then subtracts this estimate from the microphone output, Sin(k), to give the AEC output e(k). The AEC output can be interpreted as e(k)=v(k)+r(k)+n(k) where v(k) is near-end (uplink) speech (if any), n(k) is near-end noise, and r(k) is the AEC estimation error (residual). Of course, the near-end (uplink) VAD is to determine whether v(k) is zero or nonzero in a frame. Overall the AEC portion of FIG. 1a has inputs Sin(k) (microphone output) and Rout(k) (loudspeaker driver) and output e(k) (microphone output with the estimated echo cancelled). The AEC gain (also termed "echo return loss enhancement" or ERLE) is taken to be the ratio of Sin(k) power to e(k) power: $P_s(m)/P_e(m)$ where m is a frame index. Note that if the power is expressed in dB (i.e., logarithm of the power), then the ratio is expressed as a difference.

Figure 1B:
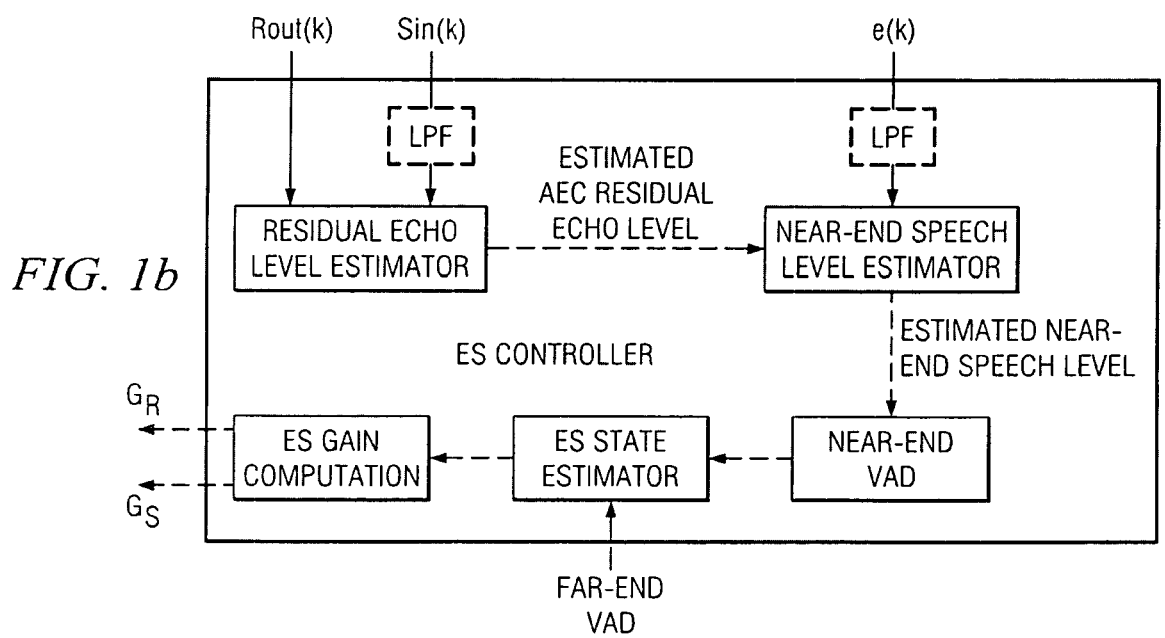

FIG. 1b is an internal block diagram of a preferred embodiment ES controller which incorporates a preferred embodiment near-end VAD. An ES controller makes ES state estimations and determines an appropriate level of attenuation for the downlink and uplink signals; i.e., $G_R$ for received (downlink) and $G_S$ for sent (uplink). In typical state estimation methods, a near-end VAD makes its decisions using the AEC output signal e(k). However, under severe nonlinear distortion, the AEC residual signal level is equal to or higher than the near-end speech level, and an energy-based near-end VAD will be ON for "far-end echo only", "near-end speech only" and "double-talk" segments. When using the far-end (downlink) VAD, the "near-end speech only" state can be discriminated from the "far-end echo only" and "double-talk" states (i.e., downlink VAD is OFF and uplink VAD is ON for "near-end speech only" state), but it is difficult to identify the difference between "far-end echo only" and "double-talk" (i.e., downlink WAD and uplink: YD decisions are both ON for both cases).

The preferred embodiment near-end VAD relies on an estimated near-end speech level instead of the AEC output signal level. The near-end speech level estimator in the figure excludes far-end echo signal power and approximates near-end speech power. The following describes a preferred embodiment method of near-end speech level estimation.

Presume the AEC output signal e(k) is the sum of near-end speech v(k), residual echo r(k), and near-end noise n(k).

$$e(k)=v(k)+r(k)+n(k)$$

Assume v(k), r(k), and n(k) are statistically de-correlated, then the expectation of e(k) power can be described as follows:

$$E[e(k)^2] \equiv \sigma_e^2$$
$$= E[(v(k) + r(k) + n(k))^2]$$
$$\approx E[v(k)^2] + E[r(k)^2] + E[n(k)^2]$$
$$= \sigma_v^2 + \sigma_r^2 + \sigma_n^2$$

Therefore, the near-end speech power is $$\sigma_v^2 = \sigma_e^2 - \sigma_r^2 - \sigma_n^2$$

Now, $\sigma_e^2$ and $\sigma_n^2$ can be easily measured or estimated. For example, the AEC output signal power $\sigma_e^2$ can be a frame power or a smoothed frame power of e(k). In the preferred embodiment ES design, $\sigma_e^2$ is measured by applying a third-order moving average (MA) smoothing to the AEC output frame power. In particular, for the m-th frame of N samples labeled from the start of the frame:

$$P_e(m) = (1/N)\Sigma_{0 \leq k \leq N \ldots 1} e(k)^2$$

$$\sigma_e^2(m) = (P_e(m) + P_e(m-1) + P_e(m-2))/3$$

The noise power $\sigma_n^2$ is estimated with asymmetric time constants $$\sigma_n^2(m) = \gamma^d \sigma_n^2(m-1) \quad \text{if } \sigma_e^2(m) < \gamma^d \sigma_n^2(m-1)$$
$$= \gamma^u \sigma_n^2(m-1) \quad \text{if } \sigma_e^2(m) > \gamma^u \sigma_n^2(m-1)$$
$$= \sigma_e^2(m) \quad \text{otherwise}$$

where $\gamma^d$ and $\gamma^u$ are the decreasing (down) and increasing (up) adaptation factors, respectively Example values are $\gamma^d=0.895$ (so with 20 ms frames, a decrease of −24 dB/s) and $\gamma^u=1.014$ (again with 20 ms frames, an increase of 3 dB/s).

The remaining term, $\sigma_r^2$, is approximated in the Residual Echo Estimator block in FIG. 1b as follows. At first, the residual echo estimator approximates an expected AEC gain or echo return loss enhancement (ERLE) for a given downlink output signal Rout(k). AEC gain, or ERLE, is a power ratio of AEC input (Sin(k)) to AEC output (e(k)); note that AEC gain is higher when AEC removes more echo. After initial convergence, AEC gain remains high under mild or no nonlinear distortion, while AEC gain becomes low under severe nonlinear distortion. The main source of nonlinear distortion, particularly for mobile speakerphones, is amplifier/loudspeaker saturation in the downlink. A very high level downlink signal overdrives the loudspeaker and causes severe nonlinear distortion. Also, significant and quick level changes of the downlink signal would make the AEC gain lower. With these assumptions, a preferred embodiment method estimates an expected AEC gain in the following process.

Let the high end (during good performance) of the range of the expected AEC gain be $G_H$ and the low end (during bad performance) be $G_L$, and let the expected AEC gain be denoted $G_{EXP}(m)$ (where m is a frame index for the speech signal). $G_{EXP}(m)$ is a function of downlink output signal frame power (or smoothed frame power) of the m-th frame. Note that the powers and thresholds are expressed in terms of dB (i.e., $10*\log_{10}$ of frame power). $G_H$ and $G_L$ are constants but depend upon phone design (e.g., loudspeaker performance, phone size, etc.). Set $G_H$ to 30 dB, and $G_L$ to 10 dB as default values. Alternatively, $G_H$ and $G_L$ can be found by measuring AEC gain (or ERLE) in real-time operation rather than pre-defining constant values.

Let $G_1(m)$ be an expected AEC gain that is estimated from the absolute power level of Rout(k). $THABS_H$ and $THABS_L$ are constant thresholds for the absolute power level of Rout(k), and we set $THABS_H$ and $THABS_L$ to −5 dBm0 (=−11 dBFS) and −20 dBm0 (=−26 dBFS), respectively, where, as usual, dBm0 denotes power in dBm (dB relative to 1 milliwatt) at zero transmission level and dBFS denotes dB with respect to full scale.

$$G_1(m) = G_L \quad \text{if } P_r(m) \geq THABS_H$$
$$= G_H \quad \text{if } P_r(m) < THABS_L$$
$$= w_1(m)G_L + (1 - w_1(m))G_H \quad \text{otherwise}$$

where $R_r(m)$ denotes the power of Rout(k) in frame m, and the weight $w_1(m)$ depends upon the frame power:

$$w_1(m) = (P_r(m) - THABS_L)/(THABS_H - THABS_L)$$

Next, $G_2(m)$ is an expected AEC gain that is estimated from the delta power level of Rout(k). (Recall a difference of logs is the log of the quotient, so the delta is a power ratio.) $THDELTA_H$ and $THDELTA_L$ are constant thresholds for the Rout(k) differential power level, and we set $THDELTA_H$ and $THDELTA_L$ to 10 dB and 5 dB, respectively.

$$G_2(m) = G_L \quad \text{if } |P_r(m) - P_r(m-1)| \geq THDELTA_H$$
$$= G_H \quad \text{if } |p_r(m) - P_r(m-1)| < THDELTA_L$$
$$= w_2(m)G_L + (1 - w_2(m))G_H \quad \text{otherwise}$$

where the weight $w_2(m)$ depends upon the delta frame power:

$$w_1(m) = (|P_r(m) - P_r(m-1)| - THDELTA_L)/(THDELTA_H - THDELTA_L)$$

Then, $G_{EXP}(m)$ is determined by taking the minimum value of $G_1(m)$ and $G_2(m)$:

$$G_{EXP}(m) = \min\{G_1(m), G_2(m)\}$$

Either $G_{EXP}(m)$ or a smoothed version of $G_{EXP}(m)$ can be used in the residual echo level estimation. The preferred embodiment ES applies third-order MA smoothing to $G_{EXP}(m)$ instead of using $G_{EXP}(m)$ as it is.

The residual echo level estimator then computes the estimated AEC residual echo power $\sigma_r^2$ using $G_{EXP}(m)$ together with the AEC input signal power $P_s(m)$ as follows. AEC input signal power $P_s(m)$ can be a (smoothed) frame power (expressed in dB; i.e., the log of the power) of the AEC input signal $Sin(k)$ at the m-th frame. In the preferred embodiment ES, $P_s(m)$ is computed by applying third-order MA smoothing to AEC input frame power. Then the residual echo level is estimated as:

$$\sigma_r^2(m) = 0.1 * 10^{P_s(m) - G_{EXP}(m)}$$

or, equivalently, $$10 \log_{10}[\sigma_r^2] = P_s(m) - G_{EXP}(m)$$

If near-end background noise, $\sigma_n^2$, is present, then the AEC residual echo level will not be lower than the background noise level. Therefore, replace the foregoing $\sigma_r^2$ estimate with the maximum of the estimate and $\sigma_n^2$. That is, $$\sigma_r^2 = \max\{0.1 * 10^{P_s(m) - G_{EXP}(m)}, \sigma_n^2\}$$

Finally, a near-end speech level estimate $\sigma_v^2 = \sigma_e^2 - \sigma_r^2 - \sigma_n^2$ is derived by computing each of the terms $\sigma_e^2$, $\sigma_r^2$, and $\sigma_n^2$ as described above. As the near-end speech level estimate no longer includes far-end echo power (i.e. near-end VAD is ON only for near-end speech or double-talk case), the ES state estimation can be simplified by only using an energy-based far-end (downlink) VAD and the preferred embodiment near-end VAD decisions. This contrasts with the ES state estimation method described in the cross-referenced patent application which requires more complicated logic as its energy-based near-end VAD could be ON for far-end echo, near-end speech, or double-talk cases. For example, the following ES state estimation logic is used for in preferred embodiment ES.

--- if far-end VAD is ON
    if near-end VAD is ON
        ES state is double-talk
    else
        ES state is far-end speech only
else
    if near-end VAD is ON
        ES state is near-end speech only
    else
        ES state is idle

---

The following example logic (used in the preferred embodiment ES) is for a preferred embodiment near-end VAD that uses the near-end speech level estimate $\sigma_v^2$:

--- if $\log 10\,(\sigma_e^2 - \sigma_r^2) > \log 10(\sigma_n^2) + $ TH1 & $\log 10\,(\sigma_e^2 - \sigma_r^2) > $ TH2
    Near-end VAD is ON
else
    Near-end VAD is OFF

--- where TH1 and TH2 are constant thresholds expressed in dB. This example does not directly use $\sigma_v^2$; instead, it compares $\sigma_e^2 - \sigma_r^2$ with $\sigma_n^2$. The second term in the if-condition was added to prevent the near-end VAD from being ON for non-stationary low-level signals such as chat in the background. In the preferred embodiment ES, TH1 was set to 6 dB, and TH2 was set to −30 dBm0 (=−36 dBFS). Note that TH1 is a relative level threshold against noise level while TH2 is an absolute level threshold. An appropriate TH2 has to be chosen for different phone microphone gain settings, which could significantly change the uplink signal levels, while TH1 is not affected by phone setting very much.

In summary, the near-end VAD proceeds with the steps of:

(a) estimating the near-end noise power $\sigma_n^2$, such as by tracking with asymmetrical increase/decrease time constants;

(b) estimating the AEC output power $\sigma_e^2$, such as by a moving average of measured frame power;

(c) estimating the AEC residual power $\sigma_r^2$ from the ratio (difference if dBs) of an estimate for the power ($P_S$) of the near-end input ($Sin(k)$), such as by measured frame power, divided by (minus if dBs) an expected AEC gain ($G_{EXP}$) computed from the power ($P_r$) of the far-end output ($Rout(k)$) and the change in the power of the far-end output; and (d) computing a near-end VAD decision from the results of (a)-(c).

3. Low-Pass Filtering of AEC Input and Output Signals

For better near-end VAD performance, low-pass filtered version of $e(k)$ and $Sin(k)$ can be used instead of using the original signals. Far-end echo generally does not contain much power in low frequencies because most loudspeakers in mobile phones have strong high-pass characteristic. This indicates that residual echo does not contain as much low-pass energy as near-end speech, and using low-pass filtered speech can enhance near-end speech level estimation by $\sigma_v^2 = \sigma_e^2 - \sigma_r^2 - \sigma_n^2$.

Loudspeaker frequency response varies from telephone to telephone, but generally rolls off at low frequency power below 800-1000 Hz. A preferred embodiment implemented a $16^{th}$-order linear phase FIR filter with cutoff frequency of 1000 Hz for narrowband (8 kHz sampling rate) applications; see broken-line blocks in FIG. 1b. Note that the same filter has to be applied to both the $e(k)$ and $Sin(k)$ signals to align the $\sigma_e^2$, $\sigma_r^2$, and $\sigma_n^2$ levels, Near-end VAD and ES state estimation can be implemented with or without this low-pass filtering, but it is better to use the filter for more reliable near-end VAD decisions. Although low-pass filter with cutoff frequency of 1000 Hz is recommended, any other cut-off frequencies or other types of filters (e.g. band-pass filter) can be used as well.

4. Modifications

Although near-end speech level estimation and near-end VAD method was designed for a robust ES state estimation, they can be used for any other speech applications that require VAD decision or near-end speech level information in uplink. The method can be applied to speech application at any sampling rates (8, 16, 48 kHz etc). The various thresholds, time constants, interpolation methods, etc, can be varied or adaptive. The VAD decisions could be soft decisions for various applications.

What is claimed is:

1. A voice activity detection method in a hands-free system, comprising the steps of:
   (a) estimating a near-end noise power;
   (b) estimating an acoustic echo cancellation (AEC) output power;
   (c) estimating an AEC residual power from (i) an estimate for a near-end input power and (ii) an expected AEC gain where the expected AEC gain is computed using a far-end output power, wherein said AEC gain is computed as the minimum of a first expected gain and a second expected gain, where said first expected gain is a first interpolation between a first high gain and a first low gain with first interpolation weights determined by a far-end signal power relative to a first high threshold and a first low thresholds and where said second expected gain is a second interpolation between a second high gain and a second low gain with second interpolation weights determined by a change in said far-end signal power relative to a second high threshold and a second low threshold; and
   (d) deciding, in one or more processors, a near-end voice activity from the results of the steps (a)-(c).

2. The method of claim 1, wherein said deciding a near-end voice activity includes a comparison of (i) said estimated AEC output power minus said estimated AEC residual power to (ii) said estimated near-end noise power.

3. The method of claim 2, wherein said deciding a near-end voice activity also includes a comparison of (i) said estimated AEC output power minus said estimated AEC residual power to (ii) a threshold.

4. An echo suppression method, comprising the steps of:
   (A) determining echo suppression (ES) states from a far-end voice activity detection (VAD) and a near-end VAD; and
   (B) wherein said near-end VAD includes:
      (a) estimating a near-end noise power;
      (b) estimating an acoustic echo cancellation (AEC) output power;
      (c) estimating an AEC residual power from (i) an estimate for a near-end input power and (ii) an expected AEC gain where the expected AEC gain is computed using a far-end output power, wherein said AEC gain is computed as the minimum of a first expected gain and a second expected gain, where said first expected gain is a first interpolation between a first high gain and a first low gain with first interpolation weights determined by a far-end signal power relative to a first high threshold and a first low thresholds and where said second expected gain is a second interpolation between a second high gain and a second low gain with second interpolation weights determined by a change in said far-end signal power relative to a second high threshold and a second low threshold; and
   (d) deciding, in one or more processors, a near-end voice activity from the results of the steps (a)-(c).

5. An acoustic controls system comprising:
   one or more processors and a memory storing a computer program, the memory and computer program being configured by the one or more processors to cause the system to provide:
   (a) a far-end input;
   (b) a far-end output coupled through a first amplifier to said far-end input;
   (c) a near-end input;
   (d) a near-end output coupled through a second amplifier and a summer to said near-end input;
   (e) an acoustic echo cancellation (AEC) filter connected between said far-end output and said summer;
   (f) an echo suppression state estimator to control said first and second amplifiers, said state estimator connected to a far-end voice activity detector (VAD) and to a near-end VAD, wherein:
      (1) said far-end VAD connects to said far-end input; and
      (2) said near-end VAD is operable to decide near-end voice activity from (A) an estimate for a near-end noise power, (B) the output power of said AEC filter, and (C) an estimate of AEC residual power derived from (i) an estimate for a near-end input power and (ii) an expected AEC gain where the expected AEC gain is computed using power measured at said far-end input, wherein said AEC gain is computed as the minimum of a first expected gain and a second expected gain, where said first expected gain is a first interpolation between a first high gain and a first low gain with first interpolation weights determined by a far-end signal power relative to a first high threshold and a first low thresholds and where said second expected gain is a second interpolation between a second high gain and a second low gain with second interpolation weights determined by a change in said far-end signal power relative to a second high threshold and a second low threshold.

* * * * *